United States Patent [19]

Pettersen et al.

[11] Patent Number: 6,062,768

[45] Date of Patent: May 16, 2000

[54] METHOD AND DEVICE FOR REPAIRING MARINE SEISMIC CABLES

[75] Inventors: Jan Bjornar Pettersen, Bodalen, Norway; Mallory Thomson, Hampshire, United Kingdom; Dag Soraker, Tvedestrand, Norway; Gerhard Kvalheim, Raudeberg, Norway; Bjorn Aae, Kristiansund, Norway

[73] Assignee: Geco A.S., Asker, Norway

[21] Appl. No.: 09/101,645

[22] Filed: May 6, 1998

Related U.S. Application Data

[63] Continuation of application No. PCT/IB97/00870, Jul. 14, 1997, abandoned.

[30] Foreign Application Priority Data

Jul. 19, 1996 [NO] Norway ..................................... 963027

[51] Int. Cl.$^7$ ....................................................... F16L 1/26
[52] U.S. Cl. ............................. 405/158; 254/384; 29/237
[58] Field of Search ................................. 405/154, 155, 405/158, 169, 170, 171, 188–193; 138/97, 107; 254/134.35 C, 384; 385/100, 134, 137; 29/237, 426.5; 285/18; 269/43

[56] References Cited

U.S. PATENT DOCUMENTS

| | | | |
|---|---|---|---|
| 2,187,878 | 1/1940 | Hill et al. ................................. | 269/43 |
| 3,812,455 | 5/1974 | Pearson .................................. | 367/154 |
| 3,831,256 | 8/1974 | Bjalme et al. ............................ | 29/237 |
| 4,130,269 | 12/1978 | Schreyer .................................. | 403/45 |
| 4,291,452 | 9/1981 | Whitman, Sr. et al. ................. | 29/235 |
| 4,493,139 | 1/1985 | McClure .................................. | 29/267 |
| 4,769,889 | 9/1988 | Landman et al. ........................ | 29/237 |
| 5,288,187 | 2/1994 | Ward ...................................... | 410/100 |
| 5,533,709 | 7/1996 | Tarbell .................................... | 254/13 |

FOREIGN PATENT DOCUMENTS

| | | |
|---|---|---|
| 4317265 | 5/1994 | Germany . |
| 92/19525 | 11/1992 | WIPO . |

OTHER PUBLICATIONS

*Norwegian Technical Dictionary*, vol. 11, 4th Edition, 1993.

*Primary Examiner*—Eileen Dunn Lillis
*Assistant Examiner*—Sunil Singh
*Attorney, Agent, or Firm*—Jacobson, Price, Holman & Stern, PLLC

[57] ABSTRACT

A device and method of replacing an electronics module in a seismic cable on the open sea, where the replacement is carried out with the aid of a small boat equipped with cable rollers, the method including positioning the part of the cable including the electronics module on a first and a second cable roller respectively in such a way that the electronics module and its couplings are located between the two rollers, clamping the sections of cable on either side of the electronics module in a first and a second clamping arrangement, respectively, with the clamping arrangements connected together via a mechanical tensioning device, moving the clamped sections of cable towards each other using the tensioning device in such a way that the tension in the seismic cable is taken up by the tensioning device, after which the electronics module can be removed and replaced after which the tensioning device is slackened slightly and the clamping arrangement is released from the sections of cable before the part of the seismic cable with the new electronics module is replaced in the sea.

4 Claims, 2 Drawing Sheets

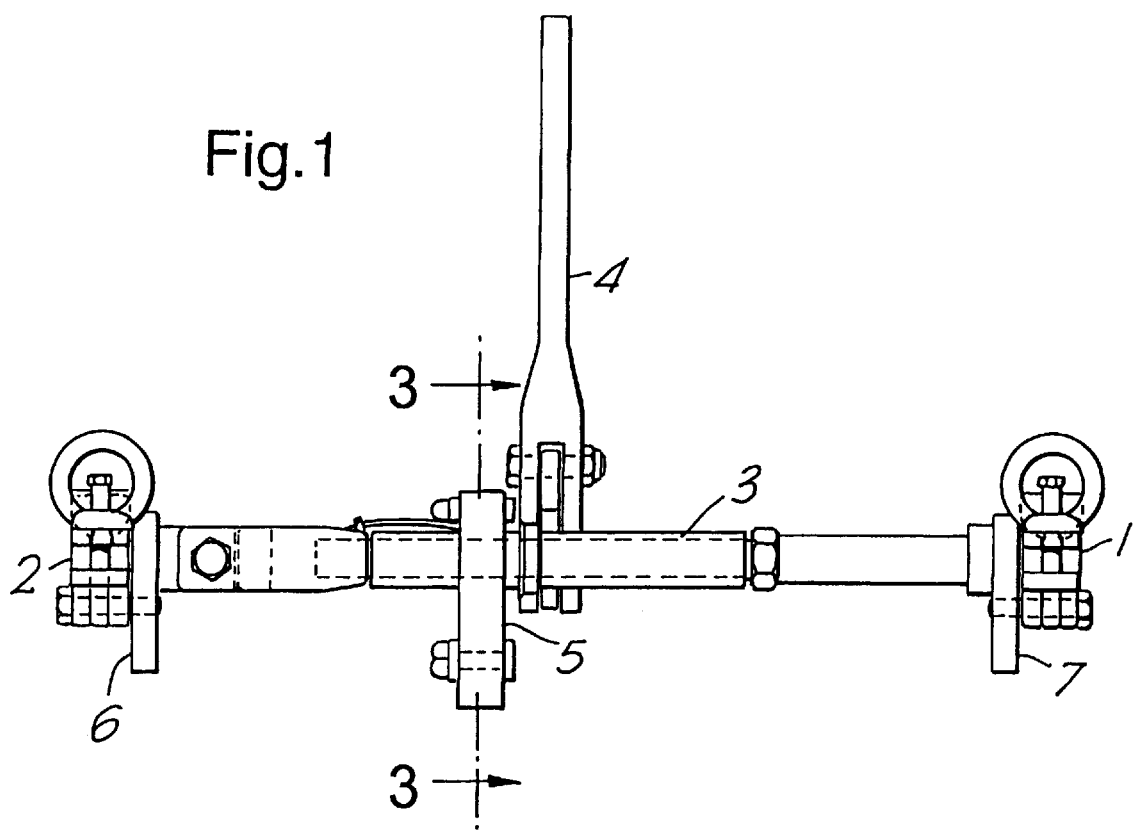
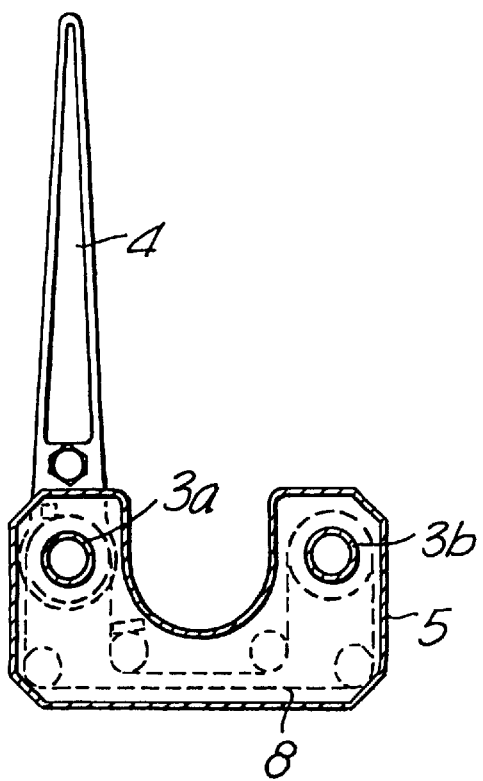

METHOD AND DEVICE FOR REPAIRING MARINE SEISMIC CABLES

This application is a continuation of PCT/IB97/00870 filed Jul. 14, 1997, now abandoned.

FIELD OF THE INVENTION

This invention relates to methods and devices for repairing marine seismic cables. More particularly, the invention concerns a method for replacing an electronics module in a marine seismic cable on the open sea, where the replacement is carried out with the aid of a dinghy or other small boat equipped with cable rollers. The invention also concerns a device to carry out the method.

BACKGROUND OF THE INVENTION

Marine seismic cables include a variety of electronics modules fitted between the sections of cable and connected to these via couplings, usually annular couplings. When a fault arises in such an electronics module, it will be necessary to replace it. The usual practice is to haul in the seismic cable and replace the electronics module on board the towing vessel. This is a time-consuming and very expensive operation, especially in the case of surveys in which each vessel is towing a number of seismic cables. If therefore it is possible for the change of the electronics module to be carried out in situ, i.e. while the cable is in the water, both time and expense will be saved.

SUMMARY OF THE INVENTION

The aim of the invention is therefore to create a method which facilitates the changing of an electronics module in a marine seismic cable on the open sea, and a device which can be used to carry out such a method.

This aim is achieved in accordance with the invention by means of a method which is characterised by the fact that it comprises in sequence stages to position the part of the cable including the electronics module on a first and a second cable roller respectively in such a way that the electronics module and its couplings are located between the two rollers, to clamp the sections of cable on either side of the electronics module in a first and a second clamping arrangement respectively, with the clamping arrangements connected together via a mechanical tensioning device, to move the clamped sections of cable towards each other using the tensioning device in such a way that the tension in the seismic cable is taken up by the tensioning device, to loosen the couplings for the electronics module, to slacken the tensioning device so that the couplings can be disconnected, after which the electronics module can be removed and replaced by a new electronics module, with the tensioning device being re-tensioned so that the new electronics module can be fitted in the seismic cable via its couplings, after which the tensioning device is slackened slightly and the clamping arrangement is released from the sections of cable before the part of the seismic cable with the new electronics module is replaced in the sea. The invention also provides a device for use in the method, characterised by the fact that the device includes on each of its sides a first and a second clamping arrangement respectively to hold a section of seismic cable, that the clamping arrangements are linked together via at least one mechanical tensioning device designed to move the clamping arrangements towards and away from each other, with the separation distance between the clamping arrangements amounting to at least the length of an electronics module with its connected couplings.

BRIEF DESCRIPTION OF THE INVENTION

The invention will now be explained in more detail, by ways of example only, with reference to the attached drawings, of which:

FIG. 1 shows a side elevation of a device according to the invention for use in replacing an electronics module in a marine seismic cable while the cable is in the sea;

FIG. 3 shows a section through the device of FIG. 1 taken along the line 3—3.

DETAILED DESCRIPTION OF THE PREFERRED EMBODIMENTS

To carry out the method according to the invention, a dinghy fitted with cable rollers is used. The dinghy is launched from the towing vessel and raises the part of the seismic cable including the electronics module to be replaced. This part is positioned on a first and a second cable roller respectively such that the electronics module and its couplings are located between the two rollers. The sections of cable on either side of the electronics module are then clamped in a first and a second clamping arrangement 1, 2 respectively of a device for carrying out the method. Each of the clamping arrangements 1, 2 is connected together via a mechanical tensioning device 3 designed to move the clamping arrangements 1, 2 towards and away from each other as desired. With the aid of tensioning device 3 the clamped sections of cable can be moved towards each other and the tension in the seismic cable taken up by the tensioning device 3. The couplings for the electronics module can then be loosened, and after the tensioning device 3 has been slackened a little, they can be removed from the seismic cable, after which the electronics module can be removed and replaced by a new electronics module, with tensioning device 3 then being retensioned so that the new electronics module can be fitted in the seismic cable via its couplings. After this the tensioning device 3 is slackened slightly again and clamping arrangements 1, 2 are removed from the sections of cable before the part of the seismic cable with the new electronics module is replaced in the sea.

Figure 2:
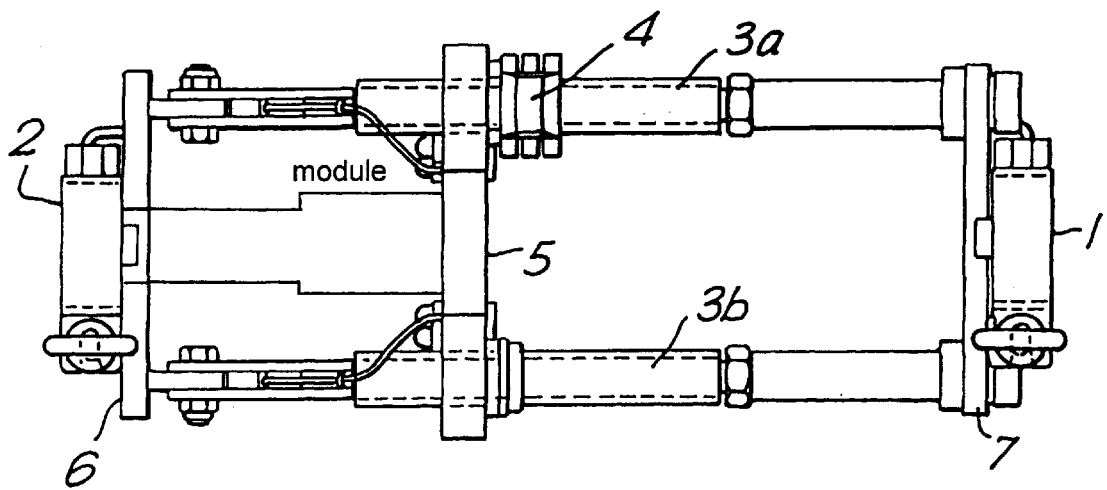
FIG. 2 shows in plan the device in FIG. 1.

The device for carrying out the method according to the invention will now be described in more detail. This device is shown in the elevation drawing in FIG. 1 and consists of a first and a second clamping arrangement 1, 2 fastened to respective end-pieces 6, 7 and connected via the tensioning device 3. The tensioning device 3 actually comprises two individual but operatively coupled together tensioning devices 3a, 3b, which are clearly shown in FIG. 2 in a preferred arrangement, and which take the form of turnbuckles (screw shackles). As with the clamping arrangements 1, 2, the turnbuckles 3a, 3b are fastened to the end-pieces 6, 7 with a separation distance such that the seismic cable can be placed in the clamping arrangements 1, 2 and between turnbuckles 3a, 3b. In the version shown in the drawing, the turnbuckles 3a, 3b are operatively connected together via a chain drive 8 shown in FIG. 3 by broken lines, which is accommodated in a housing 5. The chain drive 8 will transfer the movement of one turnbuckle, e.g. 3a, to the other turnbuckle, e.g. 3b, when turnbuckle 3a, as shown in FIG. 3, is operated with the aid of handle 4 by way of a bi-directional ratchet mechanism (not shown).

Figure 4:
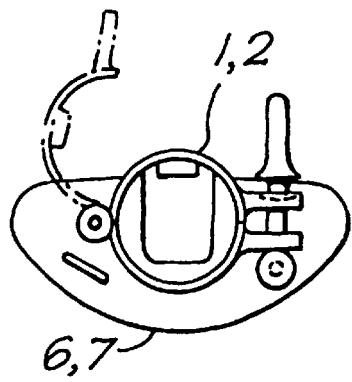
FIG. 4 shows a part of the device of FIG. 1 seen from one end.

Finally, FIG. 4 shows one of the end-pieces 6, 7 of the device according to the invention and with the clamping arrangements 1, 2 in their open and closed position respectively, the latter being indicated by broken lines.

It should be understood that the device according to the invention does not necessarily need to include two tensioning devices or turnbuckles 3a, 3b, but that in practice fewer or more tensioning devices can be used. The arrangement as shown in FIGS. 1 to 4, however, is the preferred version, as it advantageously provides an even force applied coaxially with the seismic cable when tensioning or slackening.

Finally, it should be mentioned that the tensioning device does not have to be implemented as turnbuckles, but that other forms of tensioning device can be used, e.g. based on hydraulics or pneumatics.

We claim:

1. A method of replacing an electronics module in a seismic cable on the open sea, where the replacement is carried out with the aid of a dinghy or other small boat equipped with cable rollers, the method comprising positioning a part of the cable including the electronics module on a first and a second cable roller respectively, clamping the sections of the cable on either side of the electronics module in a first and a second clamping arrangement respectively, with the clamping arrangements connected together via a mechanical tensioning device, moving the clamped sections of cable towards each other using the tensioning device in such a way that the tension in the seismic cable is taken up by the tensioning device, loosening the couplings for the electronics module, slackening the tensioning device so that the couplings can be disconnected, removing and replacing the electronics module with a new electronics module, re-tensioning the tensioning device so that the new electronics module can be fitted in the seismic cable via its couplings, gradually slackening the tensioning device, and releasing the clamping arrangement from the sections of cable before the part of the seismic cable with the new electronics module is replaced in the sea.

2. A device for use in replacing an electronics module in a seismic cable on the open sea, where the replacement is carried out with the aid of a dinghy or other small boat equipped with cable rollers, the device comprising on each of its sides a first and a second clamping arrangement each of which is adapted to damp around and hold a respective section of the seismic cable, the clamping arrangements being linked together via at least two mechanical tensioning devices designed to move the clamping arrangements towards and away from each other, the at least two mechanical tensioning devices being tensioned and slackened by means of a handle mounted on one of the at least two mechanical tensioning devices, and the at least two mechanical tensioning devices being fitted, and being connected together via a chain drive for synchronous and isodynamic pull on each of the at least two mechanical tensioning devices.

3. The device according to claim 2, wherein the chain drive is accommodated in a housing mounted on the of the at least two mechanical tensioning devices.

4. The device according to claim 3, wherein each of the at least two mechanical tensioning device is a turnbuckle.

* * * * *